D. V. BROWN.
SPRING FOR FINGER PIECE EYEGLASS MOUNTINGS.
APPLICATION FILED OCT. 14, 1910.

1,170,042.

Patented Feb. 1, 1916.

Witnesses
Daniel Webster Jr.
William Conway.

Inventor
Daniel V. Brown
By Cyrus N. Anderson
Attorney

UNITED STATES PATENT OFFICE.

DANIEL V. BROWN, OF PHILADELPHIA, PENNSYLVANIA.

SPRING FOR FINGER-PIECE EYEGLASS-MOUNTINGS.

1,170,042.  Specification of Letters Patent.  Patented Feb. 1, 1916.

Application filed October 14, 1910. Serial No. 586,997.

*To all whom it may concern:*

Be it known that I, DANIEL V. BROWN, a citizen of the United States, residing in the city and county of Philadelphia, State of Pennsylvania, have invented certain new and useful Improvements in Springs for Finger-Piece Eyeglass-Mountings, of which the following is a specification.

My invention relates to improvements in the springs for finger-piece eyeglass mountings and it has for its object to provide a spring which may be readily secured to the mounting of a pair of eyeglasses of that character; also one which is capable of an easy and practicable adjustment for the purpose of varying its tension and thereby varying the pressure of the nose guard or pad upon the nose when the glasses are worn.

Broadly considered my invention comprehends the idea of a leaf spring (which may be flat, round, or of any other shape in cross section) which spring may be secured in the mounting or connected to the lenses of a pair of eyeglasses in any manner desired and arranged to exert spring pressure upon the arms which support the guards or nose bearing pieces or upon the latter for causing them to exert pressure upon the nose when the glasses are worn.

The spring embodying my invention may be bent to different shapes to adapt it for use in connection with different forms of guard supporting arms or to adapt it for connection to mountings of different constructions and shapes. In the construction illustrated, the springs are bent and are extended toward and into proximity to the guards or nose bearing pieces and are connected to the arms of the guards thereby being indirectly and operatively connected to the said guards or nose bearing pieces. The length of the springs may vary within practical limits as desired.

As far as I am aware, leaf springs have not heretofore been employed in the construction of finger-piece eyeglass mountings but on the contrary coiled or helical springs have been employed which are difficult to secure in position and adjustment of which is impracticable. By the employment of leaf springs they may be adjusted by bending so as to vary the pressure of the guards or nose bearing pieces upon the nose.

Figure 1:
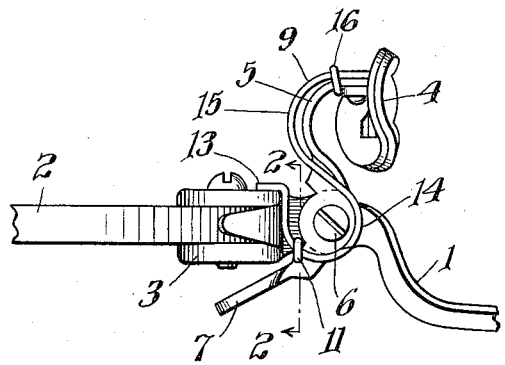
Figure 2:
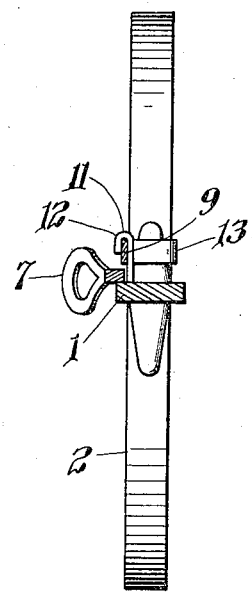

In the drawings:—Figure 1 is a top plan view of a portion of a pair of eyeglasses embodying my invention; and Fig. 2 is a section on the line 2—2 of Fig. 1.

In view of the fact that the portions of a pair of eyeglasses upon opposite sides of the center thereof are of the same construction, I have illustrated in my drawing the half portion only of a pair of eyeglasses, as a description thereof will enable a clear understanding of my invention without the necessity of showing a pair of eyeglasses complete.

In the drawings,—1 designates the bridge of a pair of eyeglasses and 2 a lens which is connected to the bridge by means of a strap 3 in the usual manner.

4 designates the nose gripping member which is supported upon the rear end of a bent lever or arm 5 pivoted at 6 upon the end of the bridge 1. The front end of the lever or arm 5 is extended to form the projecting finger-piece 7 by means of which the said lever or arm which supports and carries the nose guard is operated.

The bridge 1 together with the devices (whether straps or other means) for connecting its opposite ends to the lenses, constitute the means for connecting the lenses together.

It is to be understood that the lever or arm 5 may be secured on or to any other part or portion of the eyeglass mounting, and I desire to note here that my invention does not relate and is not limited to the particular manner of mounting and pivoting the nose gripping member supporting lever or arm 5 nor the place of supporting and pivoting the same.

The spring 9 employed by me is formed from a blank of resilient spring metal and is generally speaking S-shaped and its outer end portion is secured to the mounting by means of a short post 11 which, in the construction shown, is projected upwardly from the end of the bridge 1 at a point adjacent to the lens. The end of the post is bent upon itself, as indicated at 12, the bent over portion being spaced a short distance from the body portion of the post to provide a seat in which the spring is located. The end of the spring beyond the post 11 is extended rearwardly and is then bent laterally, as indicated at 13, along one side of the strap 3. Although the lateral bending of the spring, as indicated at 13, is desirable as a means to assist in holding the spring in a definite, fixed position, yet such lateral bending is not essential to my invention. From the post 11 the spring extends inwardly and then rearwardly and outwardly to form the bend 14 and is then extended rearwardly and inwardly to form the reverse bend 15. It is desirable that the distance between the end of the bent over portion 12 of the post 11 and the adjacent portion of the mounting shall be less than the width of the spring which is secured upon the said post in order to decrease the liability of the spring becoming displaced from its seat upon the said post; but such construction is not essential because the bent over portion 12 of the post may be clamped against the spring after it is placed in position with sufficient tightness to secure the spring in position. The rear end of the spring is located adjacent to, though not necessarily in contact with, the nose gripping member 4 and preferably extends over the rear end of the lever or arm 5 and is held in operative relation thereto by suitable means. As illustrated, the spring and the lever or arm are connected together by means of a band 16 which is bent and compressed around the rear ends of the lever or arm 5 and the said spring 9.

One of the desirable and advantageous features of the construction is that in case of the breaking of a spring such broken spring may be readily replaced by a new spring without the necessity of consulting an expert optical mechanic.

If the distance between the end of the bent over portion 12 of the post 11 and the adjacent parts of the mounting is not sufficient to permit the insertion of the spring in position by first placing one edge of the same underneath the said bent over portion and then pushing the spring into position, the said bent over portion may be bent away from the post 11 and the spring then inserted after which the bent over portion may be bent so as to clamp the spring and securely hold it in proper position.

Although the spring as described is illustrated as being flat, it may be round or of any other contour in cross section which may be preferred.

Although the spring as illustrated extends to a point in proximity to the nose gripping member, it will be understood that the length of the spring may be shortened; but not to such an extent that it cannot thereafter be adjusted by bending in the manner already indicated.

In the construction as described, it will be noted that there may be relative longitudinal movement between the spring and the lever or arm 5. The connection, however, between the said spring and the lever is such as to prevent relative lateral movement between the two.

Having thus described my invention, I claim:

1. In a pair of eyeglasses, the combination of the lenses, a bridge or equivalent member for connecting the lenses together, nose gripping members having pivotal connection with the opposite ends of the said bridge, posts secured to the opposite ends of the said bridge at points beyond the points of pivotal connection of the said nose gripping members to said bridge, which posts have hooks at their upper ends, and springs for actuating the said nose gripping members to cause them to grip the nose, the said springs extending underneath the said hooks and being held detachably in position thereby and one end of each of the said springs having operative connection with a nose gripping member and the other end thereof extending beyond a post and being in contact with a fixed part of the mounting.

2. In a pair of eyeglasses the combination of a bridge or equivalent member, nose gripping members having pivotal connection with the opposite ends of said bridge, posts secured to the opposite ends of the said bridge at points beyond the points of pivotal connection of the said nose gripping members to said bridge, which posts have hooks at their upper ends and springs for actuating the said nose gripping members to cause them to grip the nose, the said springs extending underneath the said hooks and being held detachably in position thereby.

In testimony that I claim the foregoing as my invention, I have hereunto signed my name this 13th day of October, A. D. 1910.

DANIEL V. BROWN.

In the presence of—
IRWIN SHUPP, Jr.,
CYRUS N. ANDERSON.

Copies of this patent may be obtained for five cents each, by addressing the "Commissioner of Patents, Washington, D. C."